United States Patent
Fukasawa

(10) Patent No.: US 10,089,496 B2
(45) Date of Patent: Oct. 2, 2018

(54) IMAGE FORMING APPARATUS, AND METHOD FOR CONTROLLING IMAGE FORMING APPARATUS

(71) Applicant: CANON KABUSHIKI KAISHA, Tokyo (JP)

(72) Inventor: Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 14/856,189

(22) Filed: Sep. 16, 2015

(65) Prior Publication Data

US 2016/0085979 A1 Mar. 24, 2016

(30) Foreign Application Priority Data

Sep. 24, 2014 (JP) ................................ 2014-193494

(51) Int. Cl.
| | |
|---|---|
| G06F 21/00 | (2013.01) |
| G06F 21/62 | (2013.01) |
| G06F 21/31 | (2013.01) |
| H04N 1/00 | (2006.01) |
| H04N 1/44 | (2006.01) |

(52) U.S. Cl.
CPC ............ *G06F 21/629* (2013.01); *G06F 21/31* (2013.01); *H04N 1/00151* (2013.01); *H04N 1/4406* (2013.01); *H04N 2201/0012* (2013.01)

(58) Field of Classification Search
CPC ........ G06F 21/31; G06F 21/62; G06F 21/606; G06F 21/608; G06F 21/629; H04N 1/00151; H04N 1/4406; H04N 2201/0012

USPC ....................... 726/2–4, 16–17; 713/168, 193
See application file for complete search history.

(56) References Cited

U.S. PATENT DOCUMENTS

| | | | | |
|---|---|---|---|---|
| 8,279,474 | B2 * | 10/2012 | Miyamoto | H04N 1/00233 358/1.14 |
| 8,505,089 | B2 * | 8/2013 | Maeda | H04N 1/00474 713/155 |
| 8,640,193 | B2 * | 1/2014 | Shigeeda | G06F 21/608 358/1.13 |
| 8,650,611 | B2 * | 2/2014 | Heo | G06F 21/31 713/182 |
| 8,879,099 | B2 * | 11/2014 | Mogaki | G06F 21/608 358/1.14 |
| 9,213,815 | B2 * | 12/2015 | Nishii | G06F 3/1222 |
| 9,300,648 | B2 * | 3/2016 | Sugiyama | H04N 1/44 |
| 9,348,994 | B2 * | 5/2016 | Kondoh | G06F 21/608 |

(Continued)

FOREIGN PATENT DOCUMENTS

| | | |
|---|---|---|
| CN | 103516939 A | 1/2014 |
| EP | 2469342 A1 | 6/2012 |

(Continued)

*Primary Examiner* — Hosuk Song
(74) *Attorney, Agent, or Firm* — Canon U.S.A., Inc. IP Division

(57) ABSTRACT

In an image forming apparatus, control is performed to enable, when a print function is selected with a user being authenticated, a printing operation of document data of a user registered in an authentication database and associated with the authenticated user, among document data stored in a storage unit, and to enable, when the print function is selected in a logged-in state without individual authentication, a printing operation of document data of an unauthenticated user, among the document data stored in the storage unit.

20 Claims, 9 Drawing Sheets

(56) References Cited

U.S. PATENT DOCUMENTS

2013/0167217 A1   6/2013  Inomata
2013/0347097 A1   12/2013 Pan

FOREIGN PATENT DOCUMENTS

| JP | 2010152726 A  | 7/2010  |
| JP | 2012141948 A  | 7/2012  |
| JP | 2012-203517 A | 10/2012 |
| JP | 2013134605 A  | 7/2013  |
| JP | 2014144619 A  | 8/2014  |

\* cited by examiner

FIG. 5

| | | DOCUMENT A | DOCUMENT B | DOCUMENT C | DOCUMENT A | ○○○○○○ | |
|---|---|---|---|---|---|---|---|
| Ginji | AUTHENTICATED USER: True | | | | | | |
| Buntaro | AUTHENTICATED USER: True | | | | | | |
| User X1 | AUTHENTICATED USER: False | DOCUMENT X1-1 | DOCUMENT X1-2 | | | | |
| User X2 | AUTHENTICATED USER: True | DOCUMENT X2-1 | DOCUMENT X2-1 | DOCUMENT X2-3 | | | |
| (SHARING 1) | -- | SHARED DOCUMENT 1-1 | SHARED DOCUMENT 1-2 | | | | |
| (SHARING 2) | -- | SHARED DOCUMENT 2-1 | | | | | |

500

IMAGE FORMING APPARATUS, AND METHOD FOR CONTROLLING IMAGE FORMING APPARATUS

BACKGROUND OF THE INVENTION

Field of the Invention

The present invention relates to an image forming apparatus.

Description of the Related Art

Conventionally, when document data is transmitted to an image forming apparatus from a terminal device such as a personal computer (PC) to perform printing, the printing has been immediately performed. In this case, printed sheets may remain left until a user goes to the image forming apparatus to get a printed product. Therefore, in recent years, to prevent the printed product from being left, instead of immediately performing printing when document data is received (input), after a user is authenticated in an image forming apparatus, the image forming apparatus performs printing (authentication printing).

There are some image forming apparatuses that have a function of authenticating a user who operates the image forming apparatus. In this case, the image forming apparatus causes a user to log in using a passcode or an Integrated Circuit (IC) card to identify the user who operates the image forming apparatus. By identifying the user, a function to be used, a limit on the number of output sheets, and a customized screen can be prepared for each user.

An authentication print function of an image forming apparatus in which an authentication function is operated permits operations such as display, printing, and deletion only for document data of an identified user. Thus, a document of an authenticated user can be prevented from being read, printed, and deleted by another user.

Further, an authentication function may be used only when a specific function is used so as to limit a user who can use the specific function (hereinafter referred to as functional authentication).

In this case, the image forming apparatus is made operable by any user in a normal case, and user authentication is performed when the specific function is used. While a user can use copying even when not authenticated (the user is hereinafter referred to as an unauthenticated user), facsimile (FAX) is limited to only a specific user, for example. In this case, when a FAX button is pressed, an authentication screen appears to prompt user authentication, for example.

In addition, a guest account may be provided in user authentication. Functions usable by a guest user in this case are often limited. While an authenticated user is enabled to perform color copying, the guest user is permitted to perform only black-and-white copying, for example.

Thus, in authentication printing, control is performed to permit the authenticated user to perform an operation for only a document of the user or a document which the user has been permitted to operate. That is, control is performed so as not to cause an unpermitted document to be operated by the user.

There has been proposed a method for identifying a user by performing face authentication using an imaging apparatus, so as not to print a document of another person even in an account that is assumed to be used by a plurality of users, such as a guest user account (e.g., Japanese Patent Application Laid-Open No. 2012-203517).

In a system configured as described above, when an unauthenticated user or a guest user performs the above described authentication printing, the following problems (1) and (2) occur:

(1) A document to be operated cannot be identified because a user cannot be identified; and (2) A document of another user can be made operable if all documents are set to be operated, causing security problems.

On the other hand, in a technique discussed in Japanese Patent Application Laid-Open No. 2012-203517, the user can be identified using face authentication even in a guest account. However, a special device for performing face authentication is required.

SUMMARY OF THE INVENTION

The present invention is directed to a mechanism for enabling, when a print request is issued, an authenticated user to perform a printing operation of document data of the authenticated user, and enabling an unauthenticated user to perform a printing operation of document data of an unauthenticated user, among document data stored in a storage unit.

According to an aspect of the present invention, an image forming apparatus includes a storage unit configured to store document data transmitted from outside, and a control unit configured to enable, when a print function is selected with a user being authenticated, a printing operation of document data of a user registered in an authentication database and associated with the authenticated user, among document data stored in the storage unit, and to enable, when the print function is selected in a logged-in state without individual authentication, a printing operation of document data of an unauthenticated user, among the document data stored in the storage unit.

Further features of the present invention will become apparent from the following description of exemplary embodiments with reference to the attached drawings.

BRIEF DESCRIPTION OF THE DRAWINGS

FIG. 5 illustrates an example of bibliographic information managed by the image forming apparatus.

DESCRIPTION OF THE EMBODIMENTS

Exemplary embodiments for implementing the present invention will be described below with reference to the drawings.

Description of System Configuration

Figure 1:
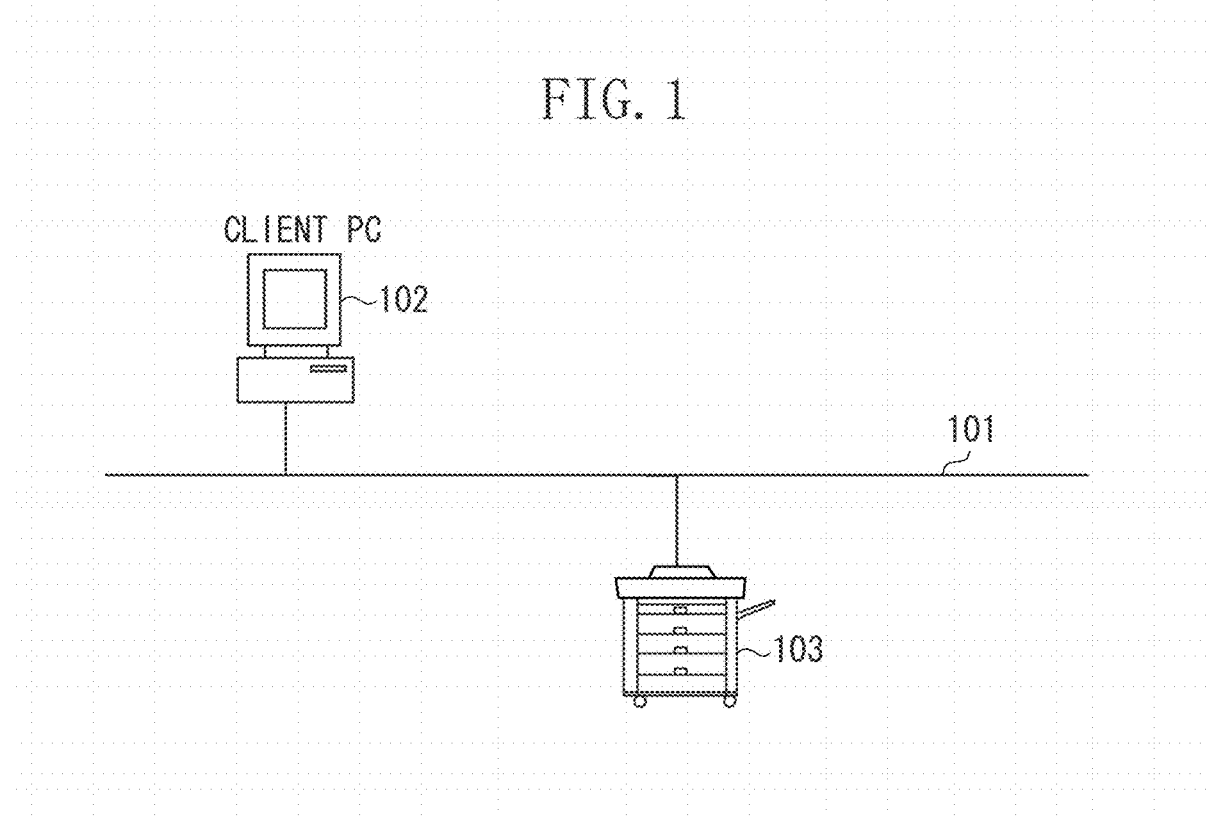
FIG. 1 illustrates an example of a configuration of a system to which an image forming apparatus is applied.

FIG. 1 illustrates an example of a configuration of a system to which an image forming apparatus according to a first exemplary embodiment is applied In FIG. 1, a client PC 102 and an image forming apparatus 103 are connected to a local area network (LAN) 101. While an input source of document data is the client PC 102 in the present exemplary embodiment, the input source may be a device other than the client PC 102 (e.g., a portable terminal or another image forming apparatus).

More specifically, during an authentication operation, in the image forming apparatus 103, when a user performs an authentication operation to log in to the image forming apparatus 103, the user acquires a list of printable documents. The list of documents input by the user to the image forming apparatus 103 in which the user has been authenticated is displayed on an operation unit 206 to be described below. When the user selects a document from the document list, the document data is output to a printer 209 illustrated in FIG. 2.

Figure 2:
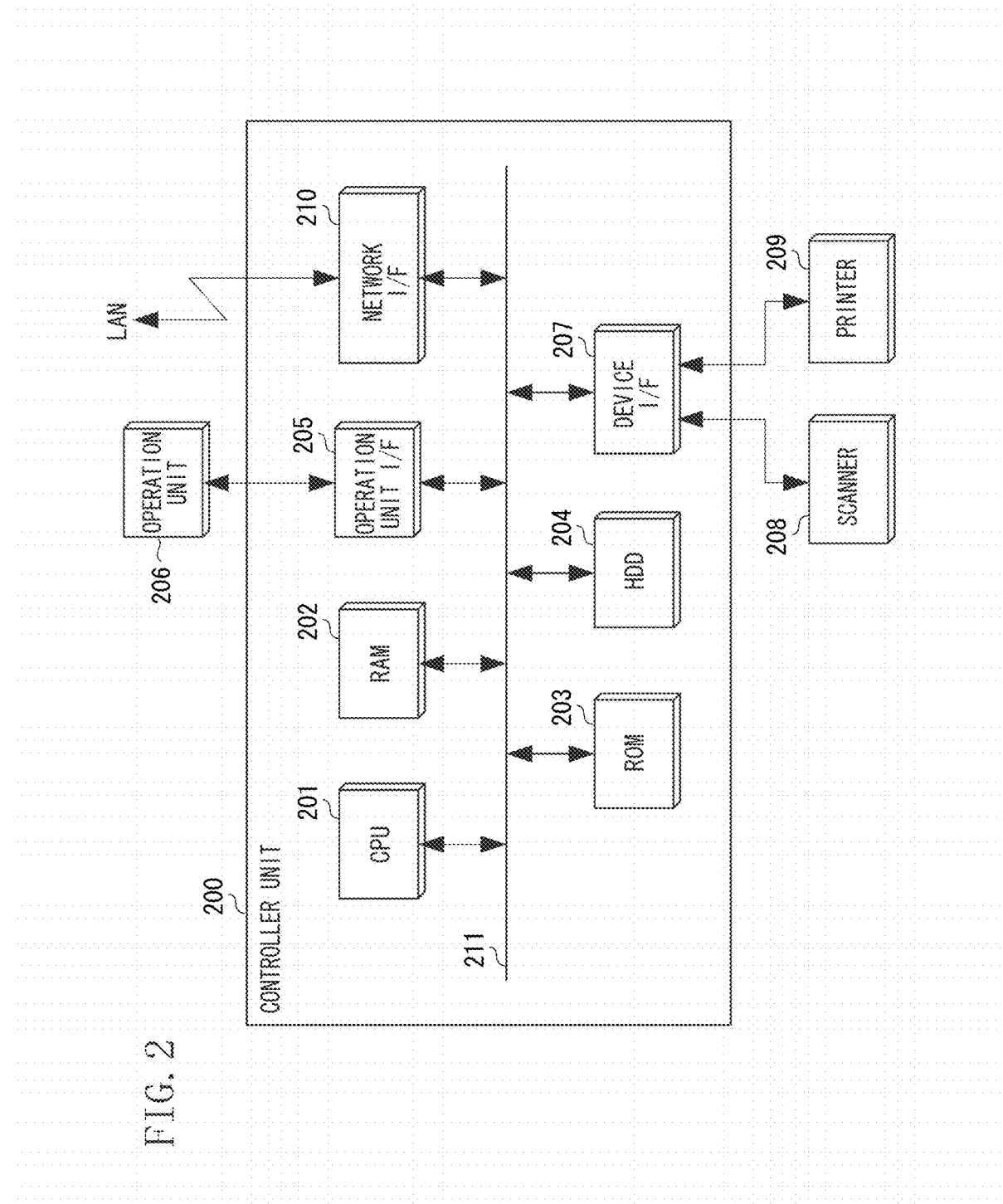
FIG. 2 is a block diagram illustrating a hardware configuration of the image forming apparatus.

FIG. 2 is a block diagram illustrating a hardware configuration of the image forming apparatus 103 illustrated in FIG. 1.

In FIG. 2, a controller unit 200 controls the image forming apparatus 103. A central processing unit (CPU) 201 is a calculation device for controlling the entire system. The CPU 201, a random access memory (RAM) 202, a read-only memory (ROM) 203, a hard disk drive (HDD) 204, an operation unit interface (I/F) 205, a device I/F 207, and a network I/F 210 are connected to a system bus 211. The CPU 201 integrally controls the devices connected to the system bus 211.

The RAM 202 is a system work memory for the CPU 201 to operate, and functions as an image memory for temporarily storing image data. A program or data such as an operating system, system software, or application software is also arranged in the RAM 202. The ROM 203 stores a boot program for the system.

The ROM 203 may store a system program or an application program, or may store information necessary for the image forming apparatus 103 such as a font. The HDD 204 stores an operating system, system software, application software, document data, image data, or setting data. The document data is generated from a job input from the client PC 102.

The CPU 201 executes the program stored in the RAM 202, and processes image data and data other than the image data that are stored in the RAM 202, the ROM 203, and the HDD 204.

In the case of a compact image forming apparatus, the image forming apparatus 103 may have a hard diskless configuration in which the HDD 204 is not loaded, and system software and application software are stored in the ROM 203. Alternatively, the image forming apparatus 103 may, of course, have a configuration in which a storage device other than a hard disk, such as a flash memory including a solid state disk (SSD), is used instead of the HDD 204.

The controller unit 200 includes the operation unit I/F 205, the device I/F 207, and the network I/F 210. The operation unit I/F 205 is connected to the operation unit 206. The operation unit 206 is a display device such as a touch panel for providing notification of a state of the image forming apparatus 103 and receiving an operation from the user, or a device for operating the image forming apparatus 103, such as an operation button for issuing an instruction to the image forming apparatus 103. The device I/F 207 connects a scanner 208 and the printer 209 that serve as an image input/output device to the controller unit 200, and inputs and outputs image data.

The image data input from the scanner 208 via the device I/F 207 is stored in the RAM 202 or the HDD 204. Image processing is performed on the stored image data with the application software stored in the RAM 202, as needed.

Similarly, when the image data is output, the image data is output to the printer 209 via the device I/F 207. The network I/F 210 is connected to a LAN, to input and output document data, image data, or information for controlling the image forming apparatus 103, to or from an external device on a network.

The image forming apparatus 103 may have a configuration not illustrated in FIG. 2. The present invention is not, of course, limited to the configuration illustrated in FIG. 2 as long as an effect of the present invention is satisfied. In the image forming apparatus 103 having a facsimile (FAX) function, for example, an I/F directed to a modem device (not illustrated in FIG. 2) is provided in the controller unit 200, and is connected to a public line by a modem, to enable FAX transmission. Alternatively, to enable data stored in a flash memory card to be read out and printed, for example, the controller unit 200 may include a universal serial bus (USB) I/F (not illustrated).

User authentication for the image forming apparatus 103 will now be described. While the description will be given using the image forming apparatus 103 as an example, the same applies to other image forming apparatuses. The image forming apparatus 103 limits its user to only a specific user, or causes a user to perform authentication before an operation so as to record an operation by the user.

For example, information about authentication (user names and passwords of users) is stored as a user database (equivalent to an authenticated user database (DB) 422 to be described below), into the HDD 204 in the image forming apparatus 103.

Before the image forming apparatus 103 is used, an authentication screen is displayed on the operation unit 206 to make a user input a user name and a password, and to permit an operation of the user only when the input user name and password match data in the user database.

Alternatively, the image forming apparatus 103 may belong to a domain of an authentication system, such as ActiveDirectory developed by Microsoft Corporation. In this case, the image forming apparatus 103 does not have a user database inside thereof, and inquires of an external authentication server on the network whether user information input by a user is valid. Alternatively, the image forming apparatus 103 may be configured to perform authentication using an IC card storing information necessary for authentication. Even if the image forming apparatus 103 is used via the network, the image forming apparatus 103 requests a connection source to perform authentication, and permits only an authenticated user to use the image forming apparatus 103.

This is a case where the image forming apparatus 103 is connected via a browser or with a file sharing protocol, for example. A known technique is used as an authentication technique in the image forming apparatus 103, and the authentication technique is not the essence of the present invention. Thus, description thereof is omitted.

If a system configuration in which a plurality of image forming apparatuses 103 is connected to the network is used, when a user database is stored in the HDD 204 of each image forming apparatus 103, the same user databases need to be synchronously stored in the respective image forming apparatuses 103 so that the image forming apparatuses 103 can perform the same authentication. A mechanism for synchronizing the user databases is not the essence of the present invention, and hence description thereof is omitted. A guest account may be provided for user authentication. This has already been described in "Description of the Related Art".

Functional authentication in the image forming apparatus 103 will be described below.

The functional authentication is a function of limiting a user who can use a specific function, by using an authentication function only when the specific function is to be used. As described in "Description of the Related Art", the image forming apparatus 103 is generally made operable even by an unauthenticated user, and user authentication is performed when a specific function is to be used.

In some cases, a user who can use a single function with a specific setting may be limited. For example, while black-and-white copying can be used even by an unauthenticated user, color copying is limited to only a specific user. In this case, when a color copying setting is made and a copy start button is pressed, an authentication screen appears to prompt user authentication, for example.

Figure 3:
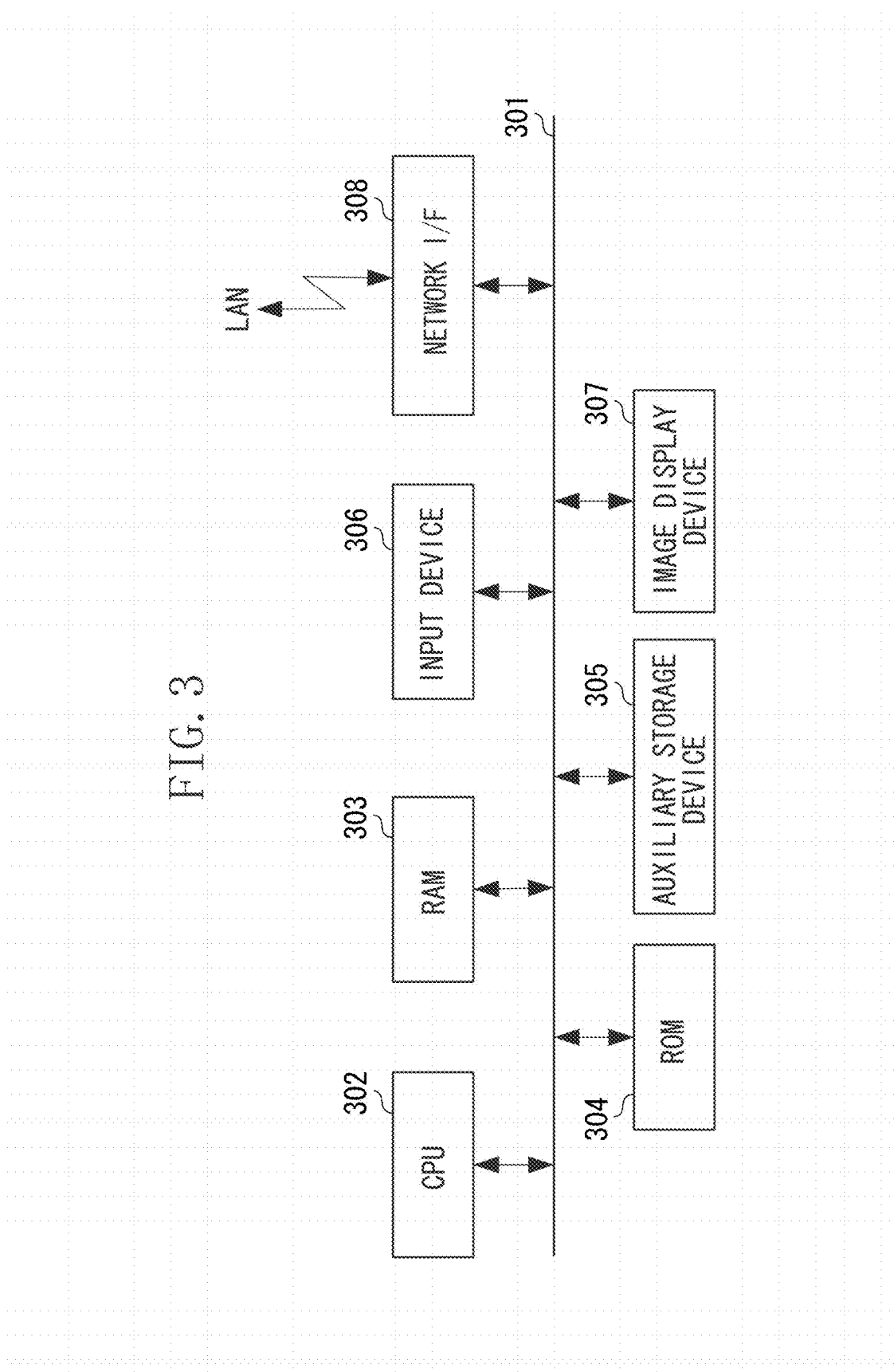
FIG. 3 is a block diagram illustrating an internal configuration of a client PC.

FIG. 3 is a block diagram illustrating an internal configuration of the client PC 102 illustrated in FIG. 1. This example is an example of an internal configuration of a general information processing apparatus.

In FIG. 3, a CPU 302 loads an operating system (OS) stored in an auxiliary storage device 305, into a RAM 303 and executes an application, to perform document processing. On the OS, a print job is input to the image forming apparatus 103 via a printer driver. The RAM 303 provides a work area of the CPU 302. A ROM 304 stores a boot program for the system as an example.

The auxiliary storage device (a hard disk, a floppy (registered trademark) disk, a compact disk read-only memory (CD-ROM), etc.) 305 provides a program. An input device 306 (e.g., a mouse or a keyboard) is operated by a user to perform input. An image display device 307 (e.g., a cathode ray tube (CRT) display or a liquid crystal display) is used for the purpose of notifying the user of a message.

A network I/F 308 exchanges data with another network device via a LAN. A main bus 301 connects these devices.

Figure 4:
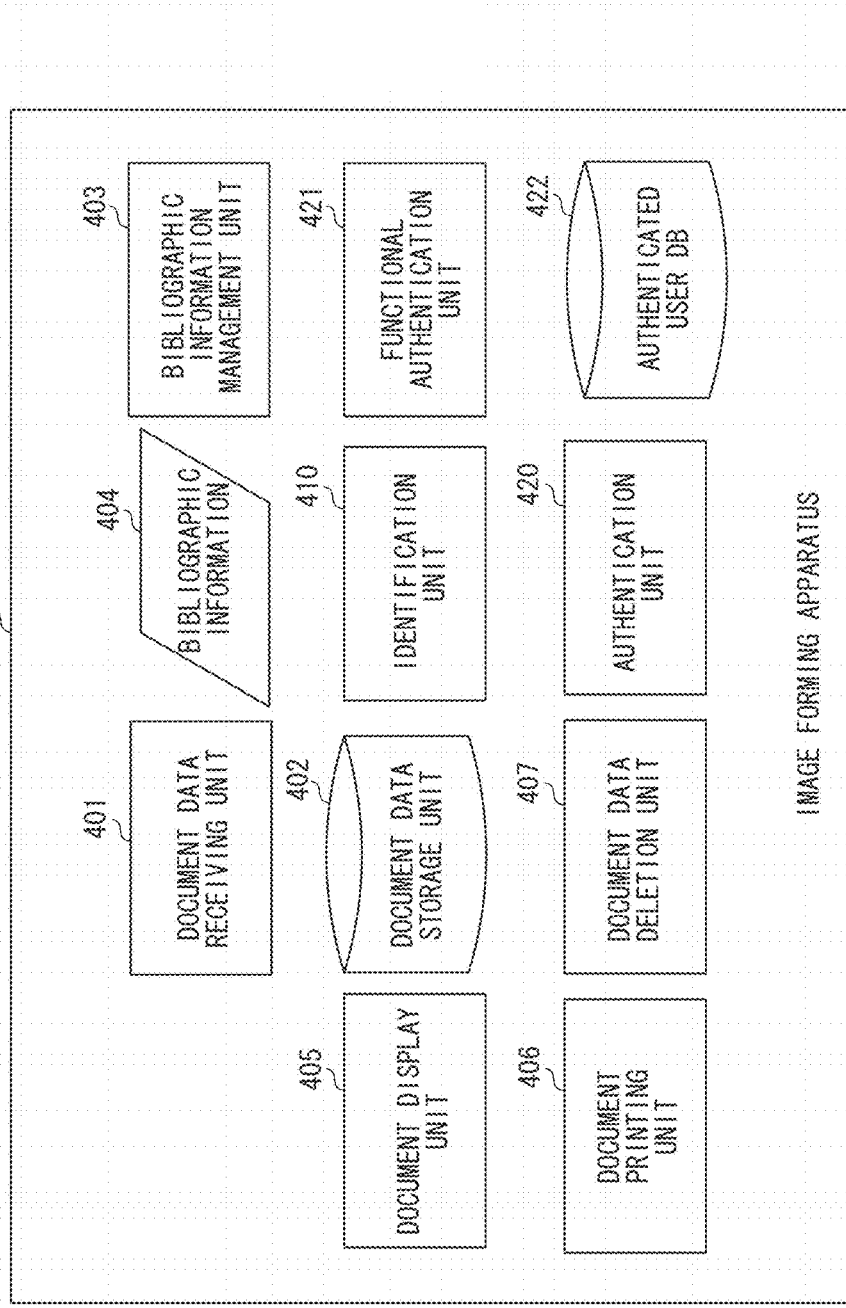
FIG. 4 is a block diagram illustrating a software configuration of the image forming apparatus.

FIG. 4 is a block diagram illustrating a software configuration of the image forming apparatus 103 according to the present exemplary embodiment. The CPU 201 of the image forming apparatus 103 executes units configured as respective modules. An operation according to the present exemplary embodiment will be described with reference to FIG. 4. In the following description, the CPU 201 is assumed to operate a program for controlling the image forming apparatus 103. The authenticated user DB 422 functioning as an authentication database is a database storing authentication information. Further, bibliographic information 404 may exist in an external server connected to the network. An operation performed when the bibliographic information 404 is stored in the external server is not the essence of the present invention, and hence description thereof is omitted.

The operation will be specifically described below for each phase of authentication printing.

Input of Document Data into Image Forming Apparatus from Client PC

The description will be given of an example in which a user inputs document data from the client PC 102 into an arbitrary image forming apparatus (the image forming apparatus 103 in the present exemplary embodiment) managed by authentication. In the present exemplary embodiment, the description will be given of an example in which Page Description Language (PDL) data is transmitted as document data to the image forming apparatus 103. Examples of the PDL include LIPS developed by Canon Inc. and PostScript developed by Adobe Systems. The image forming apparatus 103 interprets the PDL data to perform printing. The document data may, of course, be data other than the PDL data. For example, the document data may be image data such as Tagged Image File Format (TIFF) and a document format of an application as long as it is in a format interpretable and printable by the image forming apparatus 103.

The user starts a printer driver (not illustrated) of the client PC 102 from an application program in the client PC 102. An arbitrary image forming apparatus (the image forming apparatus 103 in the present exemplary embodiment) is selected from a screen of the printer driver, to issue a print instruction. When the print instruction is issued, a predetermined command (document data transmission start) is transmitted to the selected image forming apparatus 103. Upon receiving the command (document data transmission start), the image forming apparatus 103 requests the printer driver of the client PC 102 to perform authentication. The printer driver of the client PC 102 displays an authentication screen (not illustrated).

When the user inputs a user name and a password to the authentication screen displayed on the image display device 307, the input user name and password are transmitted to the image forming apparatus 103 from the client PC 102. During the transmission, control to encrypt and transmit the user name and the password may be performed.

Figure 6:
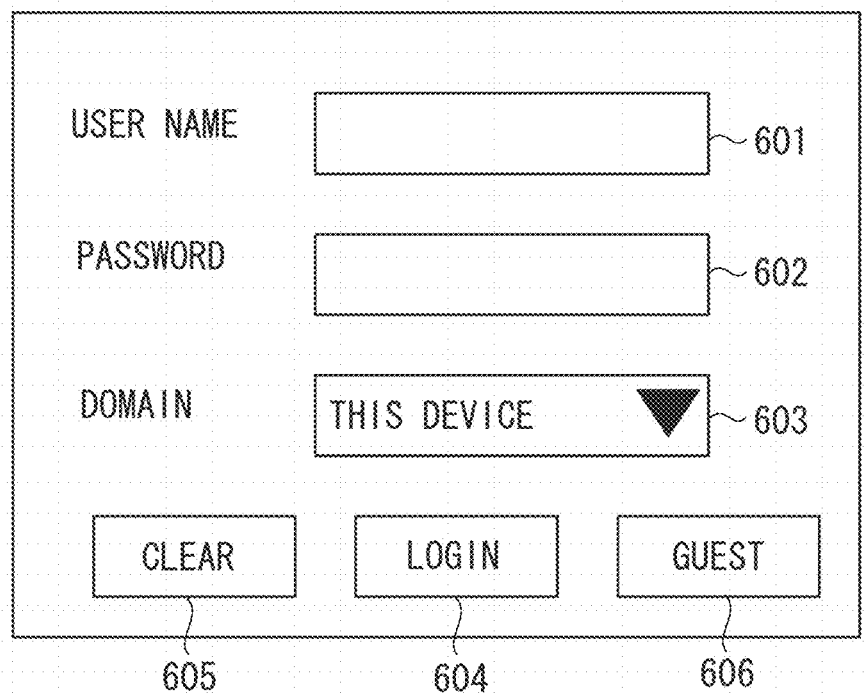
FIG. 6 illustrates an example of an authentication screen displayed on an operation unit.

In the image forming apparatus 103, the user name and the password input by the user using a user interface (UI) screen illustrated in FIG. 6 that is displayed on the operation unit 206 are verified, and information about permission of use is transmitted to the client PC 102 if the input user name and the password match data in the user database. As an alternative to transmission of the information about permission of use, a command (permission of transmission) may be transmitted.

On the other hand, if the user name and the password input by the user do not match data in the user database, a print request from the client PC 102 results in an error.

Accordingly, upon receiving the command (permission of transmission) due to success in authentication, the client PC 102 converts data of the application into PDL data.

Then, information about the user (the user name, etc.), print control information including a print setting such as two-sided printing, and the PDL data are transmitted to the image forming apparatus 103 in which the user has been authenticated. The authentication in the image forming apparatus 103 may be authentication using the authenticated user DB 422 in the image forming apparatus 103. If the client PC 102 and the image forming apparatus 103 exist in the same authentication domain, like in ActiveDirectory, and an authentication result of the client PC 102 is ensured, user information in the client PC 102 may be included in the print control information. In this case, authentication is not performed in the image forming apparatus 103.

While an example in which authentication is performed by the client PC 102 has been described in the present exemplary embodiment, instead of performing authentication when data is input from the client PC 102, a user name in the client PC 102 may be included in the print control information. Also in this case, if the same user name as the user name is registered in the authenticated user DB 422 in the image forming apparatus 103, printing is performed after the authentication performed when the image forming apparatus 103 is used. Thus, printing can be prevented from being performed by another user.

Receiving of Document Data in Image Forming Apparatus

The description will now be given of processing performed in authentication printing until the image forming apparatus 103 receives and stores the PDL data from the PC 102 after authentication is successfully performed by inputting document data from the client PC 102.

The PDL data may be interpreted by the CPU 201 using a program stored in the ROM 203 or the HDD 204, or may be interpreted by preparing dedicated hardware for a PDL interpreter. The printer driver and the interpretation of the PDL data are not the essence of the present invention, and hence detailed description thereof is omitted.

As described above, in the client PC 102, PDL data generated by the printer driver, and print control information including a print setting corresponding to the PDL data and user information are transmitted to the image forming apparatus 103 via the LAN 101.

While an example in which the PDL data and the print control information are separately transmitted will be described in the present exemplary embodiment, the PDL data may include the print control information. Alternatively, a document printing unit 406 may extract the print control information.

In the image forming apparatus 103, a document data receiving unit 401 receives the PDL data and the print control information that have been transmitted from the network I/F 210 connected to the LAN 101. An identification unit 410 identifies a user from the received print control information. A bibliographic information management unit 403 stores, for each user, information about document data into bibliographic information 404 according to the identification result.

A document data storage unit 402 stores, for each user, the received PDL data into the RAM 202 or the HDD 204 via the system bus 211 according to the identification result. A document data deletion unit 407 deletes the document data stored in the document data storage unit 402.

FIG. 5 illustrates an example of the bibliographic information 404 illustrated in FIG. 4. The bibliographic information management unit 403 manages the bibliographic information 404 as information about document data (document information) input for each user.

In FIG. 5, bibliographic information 510 relates to a user "Ginji", and bibliographic information 520 relates to a user "Buntaro". The bibliographic information pieces 510 and 520 of the respective users each includes a user name 501 and an element (True/False) of an authenticated user flag (identification information) 502 indicating whether a user is an authenticated user. Document information pieces 503 to 508 each indicate information about a document held by a corresponding user. The authenticated user "Ginji" holds a documents A, B, and C.

Bibliographic information 530 relates to a user "User X1". Since the authenticated user flag 502 is "False", the user "User X1" is identified as a user other than an authenticated user (an unauthenticated user).

The user "User X1" holds documents X1-1 and X1-2. A user name "User X1" matches a user name identified from print control information by the identification unit 410.

A group 540 indicates a group to which a plurality of users belongs. For example, if the user "Ginji" and the user "Buntaro" belong to a group "Sharing 1", shared documents 1-1 and 1-2 can be referred to, printed, and deleted by both of the users. Only a specific user may belong to a group, or all users may belong to the group. Each pieces of document information may include various types of information such as a storage destination and a reception date and time, but such information is unrelated to the present invention, and hence detailed description thereof is omitted.

Display of Document List

The description will now be given of an example in which, in the image forming apparatus 103 to which a user has logged in after being authenticated in the image forming apparatus 103, a list of documents to be printed are displayed for printing input document data. In the image forming apparatus 103, the document data storage unit 402 is assumed to be effectively functioning.

For the user to use the image forming apparatus 103, authentication is performed using a UI screen illustrated in FIG. 6.

FIG. 6 illustrates an example of an authentication screen displayed on the operation unit 206 of the image forming apparatus 103 illustrated in FIG. 1.

As illustrated in FIG. 6, in this example, a screen for making a user input a user name 601 and a password 602 is displayed on the operation unit 206, to make the user input the user name 601 and the password 602. A domain 603 is a field for selecting an authentication destination. When the user presses a button 604, user authentication processing is performed.

In FIG. 6, when the user presses a button 605, input contents of the user name 601 and the password 602 are cleared without performing the authentication processing. On the other hand, when the user presses the button 604 and login processing is performed, a user name and a password, which are respectively input into the user name 601 and the password 602 displayed on the operation unit 206, are transmitted to an authentication unit 420 or a functional authentication unit 421 illustrated in FIG. 4, via the operation unit I/F 205.

The authentication unit 420 or the functional authentication unit 421 verifies whether the input user name and password match data in the authenticated user DB 422, thereby performing user authentication.

Authentication processing is not limited to the above-mentioned authentication processing. Authentication may be performed using another authentication method such as the one using a non-contact type IC card. Further, instead of storing authentication information into a local area, an external authentication server may perform authentication as in ActiveDirectory. In such a case, the authentication unit 420 or the functional authentication unit 421 makes an inquiry to the external authentication server.

Such selection of an authentication destination is performed by switching the domain 603. A button 606 can be pressed if a "guest account" is prepared in an authentication operation. If the user presses the button 606, the user is authenticated as a guest user without inputting a user name, a password, and an authentication destination, so that the user is permitted to operate the image forming apparatus 103.

When the user "Ginji" logs in to the image forming apparatus 103 after being successfully authenticated in the image forming apparatus 103, the bibliographic information management unit 403 generates the bibliographic information 510 of the authenticated user from the bibliographic information 404, and transfers the generated bibliographic information 510 to a document display unit 405.

Figure 9A:
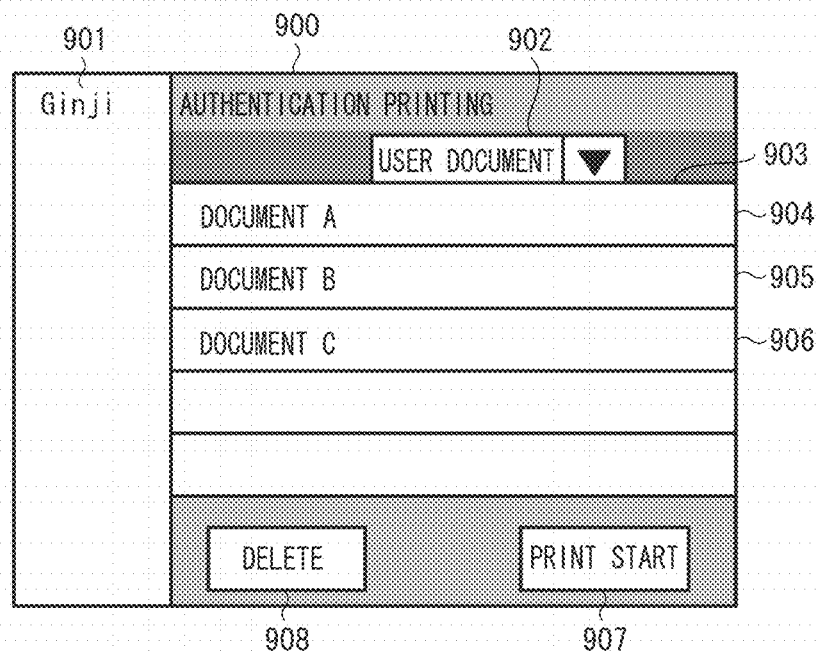
FIGS. 9A and 9B illustrate display screen of document data lists.

The document display unit 405 performs display control so as to display a document list on the operation unit 206 of the image forming apparatus 103 according to the bibliographic information 510. FIG. 9A illustrates an example of a list of documents that can be referred to and printed only by the user "Ginji".

In FIG. 9A, a display 901 indicates a user name (Ginji). A display 902 indicates the type of a document list. Based on the display 902, it is identified that the document list is a list of documents held only by the user "Ginji".

The display may be in a pull-down format to enable display of other types of document lists. Examples of other types of document lists include a list of documents shared among all users and a list of documents of a group to which the user belong.

In the example of bibliographic information 500, groups "Sharing 1" and "Sharing 2" are displayed as options. A document list 903 is a list of documents input by the user "Ginji", and three documents 904, 905, and 906 are displayed in the document list 903.

In the example illustrated in FIG. 9A, the document 904 has a document name "Document A", the document 905 has a document name "Document B", and the document 906 has a document name "Document C". This is display according to the bibliographic information 510 of the user "Ginji". When a row in the document list 903 is touched, a document corresponding to the touched row can be selected. When a print start button 907 is pressed, printing of the document selected in the document list 903 is performed. When a deletion button 908 is pressed, deletion of the document selected in the document list 903 is performed.

Figure 9B:
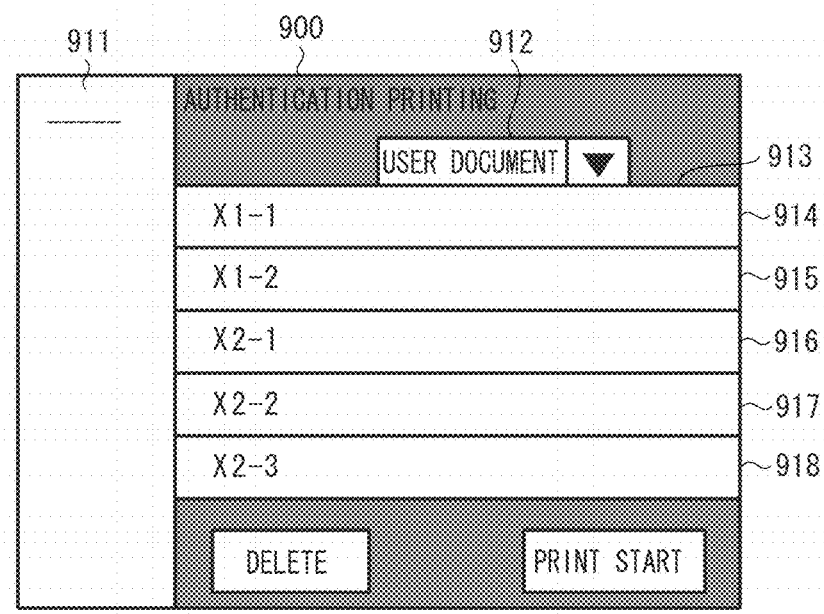

FIG. 9B illustrates an example of a list of documents that can be referred to or printed by a guest user or an unauthenticated user.

In FIG. 9B, a display 912 indicates that a document list 913 is a user document list, and is a list of documents operable by a user who is displayed in a display 911, i.e., a guest user or an unauthenticated user. Documents 914 to 918 are displayed in the document list 913.

In this example, the document 914 has a document name "Document X1-1", and the document 915 has a document name "Document X1-2". Similarly, document names of the documents 916, 917, and 918 are "Document X2-1", "Document X2-2", and "Document X2-3," respectively. The documents are documents of a user other than an authenticated user, i.e., documents of a user associated with "False" in the authenticated user flag 502 in the bibliographic information 500. Description of other displays are similar to those illustrated in FIG. 9A, and hence description thereof is not repeated.

Figure 7:
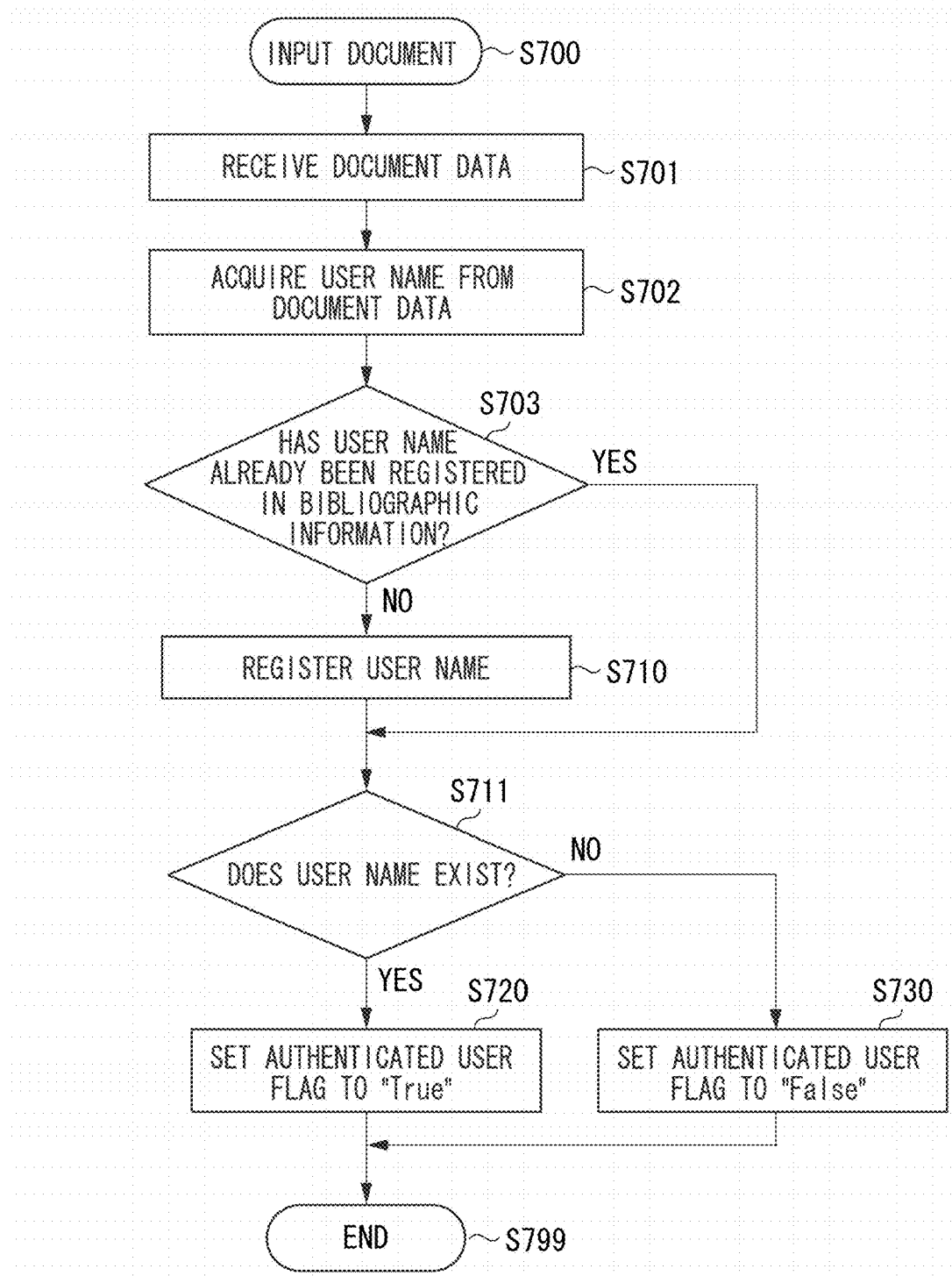
FIG. 7 is a flowchart illustrating a method for controlling the image forming apparatus.

FIG. 7 is a flowchart illustrating a method for controlling the image forming apparatus 103 according to the present exemplary embodiment. This example is an example of processing performed when a document is input as authentication printing. Each step is implemented when the CPU 201 executes a control program stored in the HDD 204. In the following description, the modules illustrated in FIG. 4 that are to be implemented by the CPU 201 are assumed to perform corresponding processes.

If a document is input in step S700, then in step S701, the document data receiving unit 401 first receives document data from the client PC 102.

In step S702, the identification unit 410 then identifies a user from the document data, and acquires a user name. In step S703, the bibliographic information management unit 403 then determines whether the user name acquired from the document data has already been registered in the bibliographic information 500 (i.e., whether the user name exists in the user name 501). If the bibliographic information management unit 403 determines that the user name has already been registered (YES in step S703), the processing proceeds to step S711. If the bibliographic information management unit 403 determines that the user name is not registered (NO in step S703), then in step S710, the bibliographic information management unit 403 registers the user name in the bibliographic information 404, and the processing proceeds to step S711.

In step S711, the authentication unit 420 determines whether the acquired user name exists in the authenticated user DB 422 (i.e., whether the user identified from the document data is an authenticated user). If the authentication unit 420 determines that the user name exists (YES in step S711), then in step S720, the bibliographic information management unit 403 sets the authenticated user flag 502 in the bibliographic information 500 to "True". If the authentication unit 420 determines that the user name does not exist (NO in step S711), then in step S730, the bibliographic information management unit 403 sets the authenticated user flag 502 to "False". Then, the processing proceeds to step S799, where the processing ends. Through such processing, as illustrated in FIG. 5, the bibliographic information 500 of documents of each user is managed according to a content of the authenticated user flag 502.

Figure 8:
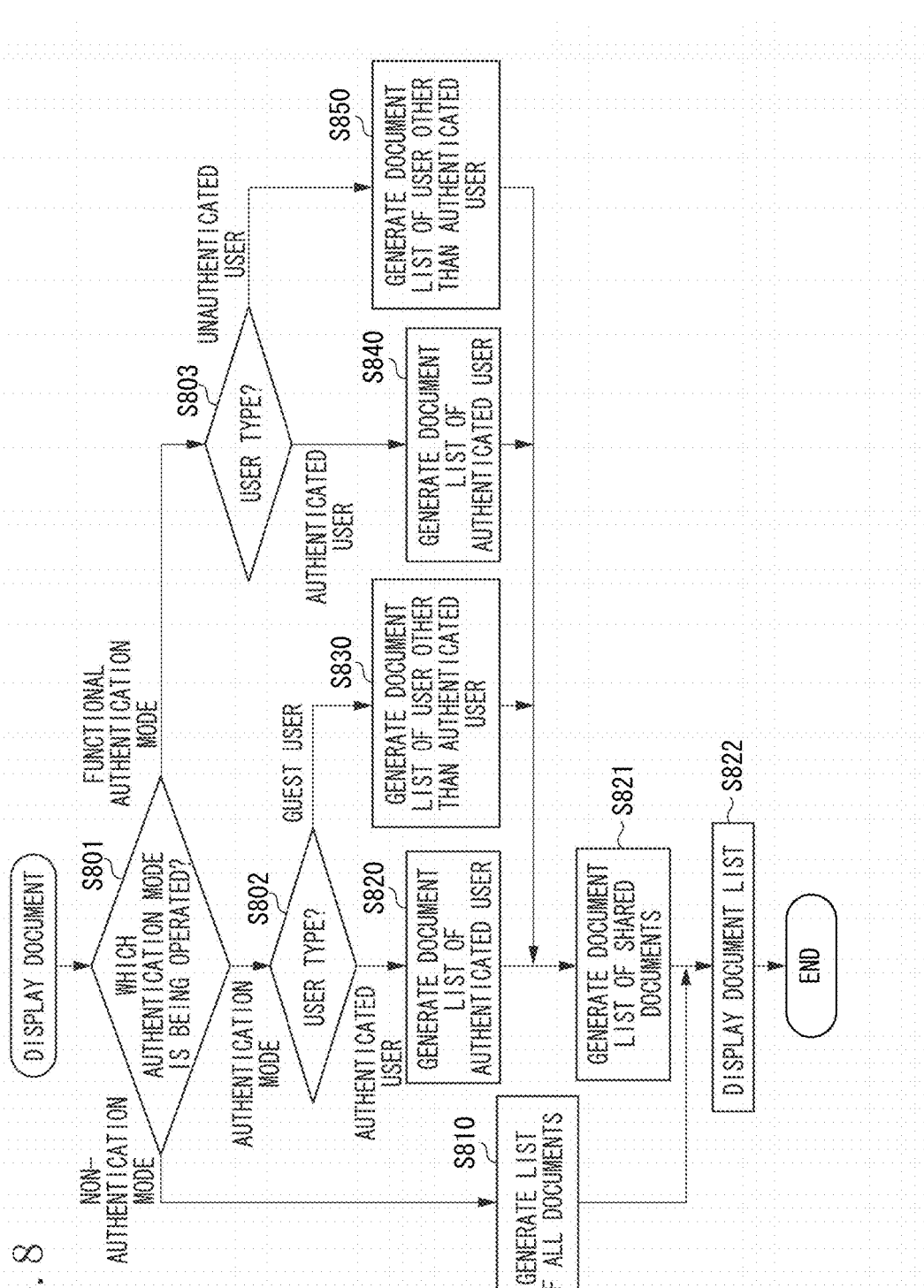
FIG. 8 is a flowchart illustrating a method for controlling the image forming apparatus.

FIG. 8 is a flowchart illustrating a method for controlling the image forming apparatus 103 according to the present exemplary embodiment. This example is an example of processing for displaying a document input from the client PC 102, on the operation unit 206, when a print function is selected. Each step is implemented when the CPU 201 executes a control program stored in the HDD 204. In the following description, the modules illustrated in FIG. 4 that are to be implemented by the CPU 201 are assumed to perform corresponding processes.

In step S801, the document display unit 405 determines whether an authentication mode currently being operated is a functional authentication mode or a non-authentication mode, so as to distribute processes depending on the type of current authentication operation (authentication type). If the document display unit 405 determines that the authentication mode is the functional authentication mode (FUNCTIONAL AUTHENTICATION MODE in step S801), the processing proceeds to step S803.

In step S803, the document display unit 405 determines the type of a user who is currently operating the image forming apparatus (user type), so as to distribute processes depending on the user type.

If the document display unit 405 determines that the user type is an unauthenticated user (UNAUTHENTICATED USER in step S803), the processing proceeds to step S850. In step S850, the document display unit 405 generates a document list of a user other than the authenticated user from the bibliographic information 404. In other words, the document display unit 405 generates document lists of all users associated with "False" in the authenticated user flag 502. Then, the processing proceeds to step S821.

On the other hand, if the document display unit 405 determines in step S803 that the user type is an authenticated user (AUTHENTICATED USER in step S803), then in step S840, the document display unit 405 generates a document list of the authenticated user from the bibliographic information 404. Then, the processing proceeds to step S821.

On the other hand, if the document display unit 405 determines in step S801 that the current authentication mode is an authentication mode (AUTHENTICATION MODE in step S801), the processing proceeds to step S802. In step S802, the document display unit 405 determines whether the type of the user is a guest user or an authenticated user, so as to distribute processes depending on the type of the user who is currently operating the image forming apparatus 103.

If the document display unit 405 determines that the user type is a guest user (GUEST USER in step S802), then in step S830, the document display unit 405 generates a document list of a user other than the authenticated user from the bibliographic information 404, and the processing proceeds to step S821. Through the processing, thereafter, the CPU 201 performs control so as to enable a print operation request of document data of the unauthenticated user (a False user not registered in the authenticated user DB 422).

On the other hand, if the document display unit 405 determines in step 802 that the user type is an authenticated user (AUTHENTICATED USER in step S802), then in step S820, the document display unit 405 generates a document list of the authenticated user from the bibliographic information 404, and the processing proceeds to step S821. Through the processing, thereafter, the CPU 201 performs control so as to enable a print operation request of document data of the authenticated user (a True user registered in the authenticated user DB 422).

In step S821, the document display unit 405 generates a list of documents shared among all users and a list of documents shared among users in a group (these documents are referred to as shared documents). In the example of the bibliographic information 500 illustrated in FIG. 5, the shared documents are documents of the groups "Sharing 1" and "Sharing 2". In step S822, the document display unit 405 displays the generated document list on the operation unit 206, and the processing ends.

On the other hand, if the document display unit 405 determines in step S801 that the authentication type is a non-authentication mode (NON-AUTHENTICATION MODE in step S801), then in step S810, the document display unit 405 generates a list of all documents (i.e., documents of all the users and shared documents), and the processing proceeds to step S822.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-193494, filed Sep. 24, 2014, which is hereby incorporated by reference herein in its entirety.

What is claimed is:

1. An image forming apparatus configured to, using a display unit configured to display information and an authentication unit configured to perform user authentication based on a user database in which information of an eligible user is registered, manage printing data in association with a user registered in the user database, and to cause the display unit to display a screen including a printing data list associated with a user authenticated by the authentication unit, the image forming apparatus comprising:
   one or more controllers having at least one processer executes programs or a circuitry realizing a specific function, the one or more controllers being configured to function as:
   a storage unit configured to store document data transmitted from outside; and
   unit configured to display, based on input of an instruction for causing the display unit to display a list of printable data in a state where a user has not been authenticated by the authentication unit, a screen including a printing data list not associated with any of the user registered in the user database
   wherein the screen including the printing data list associated with an authenticated user further includes a shared printing data list, and
   wherein the screen including the printing data list not associated with any of the users registered in the user database further includes a shared printing data list.

2. The image forming apparatus according to claim 1, wherein the screen including the printing data list is a screen to which a printing instruction is capable of being provided.

3. The image forming apparatus according to claim 1, wherein the authenticated user is authenticated using a user name and a password.

4. The image forming apparatus according to claim 1, wherein the authenticated user is authenticated using authentication information stored in a storage media.

5. The image forming apparatus according to claim 4, wherein the storage media is an IC card.

6. The image forming apparatus according to claim 1, wherein the one or more controllers being configured to function as the authentication unit.

7. The image forming apparatus according to claim 1, wherein the image forming apparatus is capable of communicating with a server apparatus via a network, the server apparatus being configured to function as the authentication unit.

8. The image forming apparatus according to claim 1, wherein the one or more controllers further function as:

a unit configured to obtain printing data transmitted from an external apparatus and to associate the printing data with a corresponding user registered in the user database based on user information appended to the printing data.

9. A method of controlling an image forming apparatus configured to, using a display unit configured to display information and an authentication unit configured to perform user authentication based on a user database in which information of an eligible user is registered, manage printing data in association with a user registered in the user database, and to cause the display unit to display a screen including a printing data list associated with a user authenticated by the authentication unit, the method comprising:
  causing the display unit to display a screen including a printing data list not associated with any of the users registered in the user database based on input of an instruction for causing the display unit to display a list of printable data in a state where a user has not been authenticated by the authentication unit
  wherein the screen including the printing data list associated with an authenticated user further includes a shared printing data list, and
  wherein the screen including the printing data list not associated with any of the users registered in the user database further includes a shared printing data list.

10. A method of controlling a printing apparatus, the method comprising:
  obtaining a result of personal authentication based on a user database in which a user capable of using the printing apparatus is registered;
  storing printing data transmitted from an outside;
  receiving an instruction from a user to display printable printing data; and
  performing display control such that, in a case where the instruction has been received in a state in which the personal authentication based on the user database has been performed, a list of printing data associated with an authenticated user among printing data that is stored is displayed, and in a case where the instruction has been received in a state in which the personal authentication based on the user database has not been performed, a list of printing data not associated with any of users registered in the user database among the printing data that is stored is displayed.

11. The method according to claim 10, further comprising managing each piece of printing data by associating the piece of printing data with identification information of a user and information representing whether or not the user identified by the user information is registered in the user database,
  wherein the display control is performed such that, in the case where the instruction has been received in the state in which the personal authentication based on the user database has not been performed, a list of printing data associated with information indicating a user not registered in the user database is displayed.

12. The method according to claim 11, further comprising receiving printing data and identification information of a user transmitted from the outside,
  wherein the printing data and identification information of a user that have been received are managed in association with each other.

13. The method according to claim 10, wherein, in the display control, a list of common printing data that all users are allowed to print is also displayed.

14. The method according to claim 10, further comprising accepting input of a user name and a password,
  wherein the personal authentication is performed based on the user name and the password that have been input and a user name and a password that are registered in the user database.

15. The method according to claim 10,
  wherein the printing apparatus holds the user database and includes an authentication unit that performs the personal authentication by using the user database that the printing apparatus holds, and
  wherein, in the obtaining, a result of the personal authentication performed by the authentication unit is obtained.

16. The method according to claim 10,
  wherein the user database is held in a server apparatus with which the printing apparatus is capable of communicating via a network, and
  wherein, in the obtaining, a result of the personal authentication performed by the server apparatus is obtained.

17. The method according to claim 10, wherein the state in which the personal authentication based on the user database has not been performed includes a case where a user is authenticated as a guest user.

18. The method according to claim 10, wherein the instruction from a user to display printable printing data is selection of a printing function by a user.

19. The method according to claim 10, wherein printing data selected from the list of printing data displayed in the display control is printed.

20. A printing apparatus comprising:
  an obtaining unit configured to obtain a result of personal authentication based on a user database in which identification information of a user capable of using the printing apparatus is registered;
  a storage unit configured to store printing data transmitted from an outside;
  a receiving unit configured to receive an instruction from a user to display printable printing data; and
  a display control unit configured to perform control such that, in a case where the instruction has been received in a state in which the personal authentication based on the user database has been performed, a list of printing data associated with an authenticated user among printing data stored in the storage unit is displayed, and such that, in a case where the instruction has been received in a state in which the personal authentication based on the user database has not been performed, a list of printing data not associated with any of users registered in the user database among the printing data stored in the storage unit is displayed.

* * * * *